Figure 1:
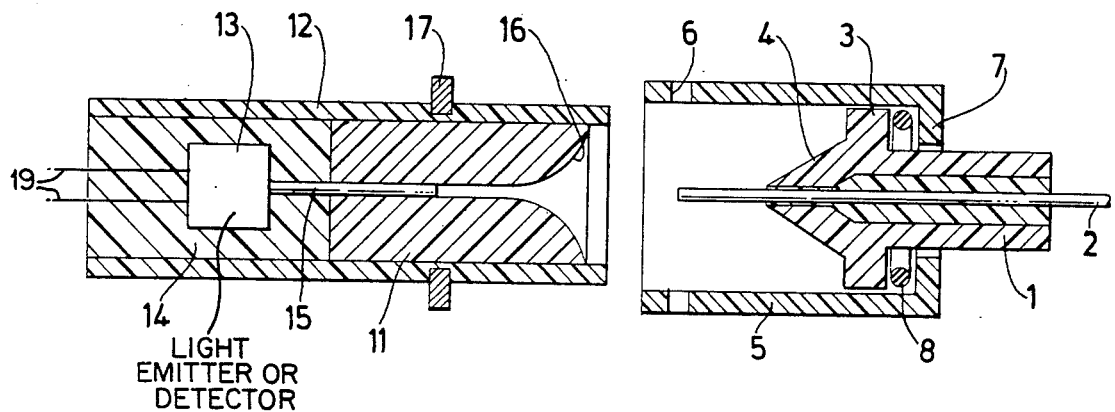

OR  3,948,582

United States P                               3,948,582
Martin                                                                             Apr. 6, 1976

[54] OPTICAL FIBRE CONNECTOR

[75] Inventor: David Joseph Martin, Leicester Forest East, England

[73] Assignee: BICC Limited, London, England

[22] Filed: Nov. 15, 1974

[21] Appl. No.: 524,240

[30] Foreign Application Priority Data
Nov. 16, 1973   United Kingdom............... 53462/73

[52] U.S. Cl............. 350/96 C; 250/227; 350/96 WG
[51] Int. Cl.²............................................. G02B 5/14
[58] Field of Search. 350/96 C, 96 R, 96 B, 96 WG; 250/227

[56] References Cited
UNITED STATES PATENTS

| | | | |
|---|---|---|---|
| 3,734,594 | 5/1973 | Trambarulo | 350/96 WG X |
| 3,803,409 | 4/1974 | Prochazka | 350/96 C X |
| 3,861,781 | 1/1975 | Hasegawa et al. | 350/96 C |

*Primary Examiner*—Siegfried H. Grimm
*Attorney, Agent, or Firm*—Buell, Blenko, & Ziesenheim

[57] ABSTRACT

An optical fibre connector comprises separately formed bodies of substantially elongate form, each having an axial bore in which an optical fibre can be fitted and, associated with the two bodies or with each pair of adjacent bodies, means for connecting said bodies together in substantially axial alignment. One of said bodies has an end, e.g. a flared socket, of such a configuration having regard to the configuration of an end, e.g. a conical plug, of the other of said bodies that as said bodies are moved axially towards one another to connect said bodies together, an optical fibre carried by one of said bodies is constrained to lie in substantially axial alignment with and to enter the bore of the other of said bodies and that when said bodies each carrying an optical fibre are connected together the neighbouring end faces of the optical fibres abut or are closely spaced apart. The connecting means for adjacent bodies preferably comprises a sleeve freely rotatably mounted on one body that is in screw-threaded engagement with, or makes a bayonet-type connection with, the other body.

16 Claims, 2 Drawing Figures

LIGHT EMITTER OR DETECTOR

OPTICAL FIBRE CONNECTOR

This invention relates to optical transmission systems for the transmission of the ultra-violet, visible and infrared regions of the electromagnetic spectrum, which regions, for convenience, will hereinafter be included in the generic term "light," and especially, but not exclusively, to optical transmission systems for use in the telecommunications field adapted for transmission of light having a wave-length within the range 0.8 to 1.1 micrometres.

The invention is particularly concerned with optical transmission systems of the kind in which light being transmitted from a light-emitting device to a detector device is caused to travel along at least one path built up of at least two optical fibres connected end-to-end. Each optical fibre of the system may be of a single transparent material, the refractive index of which may gradually decrease in a direction towards the outer surface of the fibre over at least a part of the distance between the central axis of the fibre and its outer surface, or each optical fibre may be of composite form comprising a core of transparent material clad throughout its length with another transparent material of lower refractive index which, by total internal reflection of light being transmitted along the fibre, confines at least a major proportion of the light within the core. A composite optical fibre is generally, but not necessarily, made of two glasses of different refractive indices, the glass forming the core having a higher refractive index than the glass forming the cladding; the refractive index of the core may gradually decrease in a direction towards the outer surface of the core over at least a part of the distance between the central axis of the core and its outer surface. In an alternative form of composite fibre the core may be made of a transparent liquid having a higher refractive index than that of the cladding. Each optical fibre of the system is generally, but not necessarily, of circular cross-section.

In an optical transmission system of this kind it is important that all, or at least a major proportion, of the light travelling along one of two optical fibres connected end-to-end shall pass into and travel along the other of said two interconnected optical fibres. Where a permanent connection is effected between two optical fibres it is not difficult to effect an optical fibre connection that has a high light-transfer efficiency but where a detachable connection is required between two optical fibres the provision of a detachable connection that will have a high light-transfer efficiency every time the connection is effected is a far more difficult problem.

It is an object of the present invention to provide a simple and inexpensive optical fibre connector for effecting a detachable connection of high light-transfer efficiency every time the connection is made.

According to the invention the optical fibre connector comprises at least two separately formed bodies of substantially elongate form each having an axial bore in which an optical fibre is or can be fitted and/or secured and, associated with the two bodies of each pair of adjacent bodies, means for connecting said bodies together in substantial axial alignment, one of the said bodies having an end of such a configuration having regard to the configuration of an end of the other of said bodies that as said bodies are moved axially towards one another to connect said bodies together an optical fibre carried by one of said bodies is constrained to lie in substantially axial alignment with and to enter the bore of the other of said bodies and that when said bodies each carrying an optical fibre are connected together the neighbouring end faces of the optical fibres abut or are closely spaced apart.

Preferably at least the end portion of the bore of one of the two bodies, or of one of each pair of adjacent bodies, is of substantially circular cross-section and has an internal diameter that increases smoothly towards the end of the body to form a female member or socket, and at least an end portion of the other of said bodies is of substantially circular cross-section and has an external diameter that decreases smoothly towards the extreme end of the body to form a male member or plug of a configuration that is substantially complementary to the configuration of the female member or socket of the first body. The rate of increase in the internal diameter of the female member or socket per unit length may itself increase in a direction towards the extreme end of the body to form a socket of substantially flared form which will further facilitate initial introduction of the optical fibre of the male member or plug which, in this case, is preferably of a substantially conical form.

The means associated with said bodies for connecting them together may take any convenient form but it preferably comprises a sleeve that surrounds, and is freely rotatably mounted on, one of said bodies and makes a bayonet-type connection with the other of said bodies. The connecting means may be of such a form as to cause said bodies to move axially towards or away from one another and, in this case, it is preferably of a form that will cause said bodies so to move without effecting relative rotational movement between said bodies. Such means preferably comprises a sleeve that surrounds, and is freely rotatably mounted on, one of said bodies and is in screw-threaded engagement with the other of said bodies.

One or each of said bodies may be mounted in a casing and, where the optical fibre carried by a body is the connecting tail of a light-emitting device, a detector or other device, the casing of the body may also house the device.

Where the optical fibre in one or each of said bodies is of composite form and has a core of a transparent liquid, preferably a layer of sealing material is provided on one or each of the inter-engaging faces of said bodies or a sealing washer is provided between the two faces.

The optical fibre carried by the male member or plug preferably protrudes a predetermined distance beyond the extreme end of the plug and, when the body incorporating the female member or socket also carries an optical fibre, the end of this optical fibre is spaced a similar distance from the point in the bore of the body where the diameter of the bore starts to increase, said distances being such that when said bodies are connected together with the plug and socket fully inter-engaged and with parts of said bodies, and/or of a casing of the or each body, abutting, the end faces of the optical fibres abut or are closely spaced apart.

Optical fibres carried by said bodies, or where these optical fibres are of composite form the cores of the composite optical fibres, may be of the same diameter or one may be of a diameter greater than the other. In the latter case that one of said bodies carrying the optical fibre of smaller diameter will be arranged to be nearer the light-emitting device of an optical transmission system in which it is connected than the other of said bodies.

If desired both ends of one body of a connector of the present invention may be appropriately shaped for use in a three-part connector, for instance each end may constitute a socket and be adapted for connetion to the plug of another body carrying an optical fibre, or vice versa.

Figure 2:
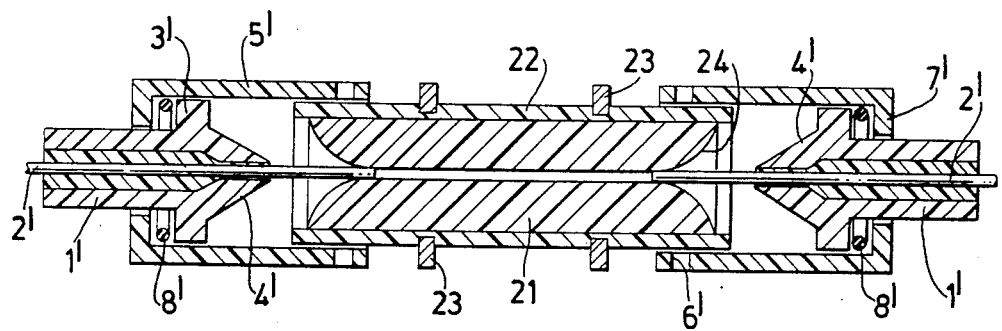

The invention is further illustrated by a description, by way of example, of a preferred two-part optical fibre connector and of a three-part optical fibre connector with reference to the accompanying drawing, in which:

FIG. 1 is a cross-sectional exploded side view of the preferred two-part connector, drawn on an enlarged scale, and FIG. 2 is a cross-sectional side view of the three-part connector, drawn on an enlarged scale.

Referring to FIG. 1, the connector comprises a body 1 and a body 11. The body 1 has an axial bore in which is cemented an optical fibre 2. The body 1 is of circular external cross-section and has; between its ends, a radially extending flange 3. At one end of the body the external diameter of the body decreases smoothly to form a conical plug 4, the optical fibre 2 protruding a predetermined distance from the plug at that end. Freely rotatably mounted on the body 1 is a sleeve 5 which has a pair of diametrically opposed L-shaped slots 6 opening into one end of the sleeve. The other end of the sleeve 5 has a radially inwardly extending flange 7. A washer 8 of compressible material is provided between the flange 7 and the flange 3. The body 11 is mounted in a part of the bore of a tubular casing 12, the other part of the bore housing a detector 13 encapsulated in resin 14, with its terminal leads 19 protruding from the housing. The body 11 has an axial bore in which is housed the optical fibre connecting tail 15 of the detector 13, the free end of the tail being positioned inwardly from a point in the bore where the internal diameter gradually increases to form a flared socket 16. The casing 12 carries a pair of lugs 17 for engaging in the L-shaped slots 6 of the sleeve 5.

When the two bodies 1, 11 are to be connected together the conical plug 4 is introduced into the flared socket 10 and the sleeve 5 is urged axially so that the lugs 17 engage in the L-shaped slots 6 and the washer 8 is compressed. The optical fibres 2 and 15 are constrained to lie in substantially axial alignment and when the flange 3 abuts the end face of the casing 12 the bodies are fully engaged with the end faces of the optical fibres 2 and 15 abutting. The sleeve 5 is then rotated with respect to the casing 12 to lock the two bodies 1, 11 together.

The three-part connector shown in FIG. 2 comprises two bodies 1' similar to the body 1 in FIG. 1 and an intervening connector body 21. The connector body 21 is housed in a tubular casing 22 having lugs 23 at each of its ends for effecting a bayonet-type connection with L-shaped slots 6' in a sleeve 5' of another connector body 1'. The body 21 has an axial bore and, at each end of the body, the diameter of the bore increases smoothly to form a flared socket 24. When optical fibres 2' carried by the two bodies 1' are to be connected, the conical plug 4' of each body 1' is introduced into one flared end 24 of the body 21 and its respective sleeve 5' is urged axially so that the lugs engage in the L-shaped slots 6' and a washer 8' of compressible material is compressed. As in the connector shown in FIG. 1 the optical fibres 2' are constrained to lie in substantially axial alignment and when each flange 3' abuts the end face of the casing 22, the bodies 1', 21 are fully engaged with the end faces of the optical fibres 2' abutting. Each sleeve 5' is then rotated with respect to the casing 22 to lock the two bodies 1', 21 together.

What I claim as my invention is:

1. An optical fibre connector comprising at least two separately formed bodies of substantially elongate form, each having an axial bore in which an optical fibre can be fitted and, associated with the two bodies or with each pair of adjacent bodies, means for connecting said bodies together in substantially axial alignment, one of said bodies having an end of such a configuration having regard to the configuration of an end of the other of said bodies that as said bodies are moved axially towards one another to connect said bodies together, an optical fibre carried by one of said bodies is constrained to lie in substantially axial alignment with and to enter the bore of the other of said bodies and that when said bodies each carrying an optical fibre are connected together the neighbouring end faces of the optical fibres abut or are closely spaced apart.

2. An optical fibre connector comprising at least two separately formed bodies of substantially elongate form, each having an axial bore in which an optical fibre can be fitted and, associated with the two bodies or with each pair of adjacent bodies, means for connecting said bodies together in substantially axial alignment, at least the end portion of the bore of one of said bodies being of substantially circular cross-section and having an internal diameter that increases smoothly towards the end of the body to form a socket, at least an end portion of the other of said bodies being of substantially circular cross-section and having an external diameter that decreases smoothly towards the extreme end of the body to form a plug of a configuration that is substantially complementary to the configuration of the socket of the first body, and the arrangement being such that as said bodies are moved axially towards one another to connect said bodies together an optical fibre carried by one of said bodies is constrained to lie in substantially axial alignment with and to enter the bore of the other of said bodies and that when said bodies each carrying an optical fibre are connected together the neighbouring end faces of the optical fibres abut or are closely spaced apart.

3. An optical fibre connector as claimed in claim 2, wherein the rate of increase in the internal diameter of the socket per unit length increases in a direction towards the extreme end of the body to form a socket of substantially flared form and wherein the plug is of a substantially conical form.

4. An optical fibre connector as claimed in claim 2, wherein the optical fibre carried by the plug protrudes a predetermined distance beyond the extreme end of the plug and, when the body incorporating the socket also carries an optical fibre, the end of this optical fibre is spaced a similar distance from the point in the bore of the body where the diameter of the bore starts to increase, said distances being such that when said bodies are connected together with the plug and socket fully inter-engaged and with parts of the bodies abutting, the end faces of said optical fibres abut or are closely spaced apart.

5. An optical fibre connector comprising at least two separately formed bodies of substantially elongate form each having an axial bore in which an optical fibre can be fitted and means associated with the two bodies or with each pair of adjacent bodies for causing said bodies to move axially with respect to one another, one of said bodies having an end of such a configuration having regard to the configuration of an end of the other of said bodies that as said bodies are caused to move axially towards one another to connect said bodies together, an optical fibre carried by one of said bodies is constrained to lie in substantially axial alignment with and to enter the bore of the other of said bodies and that when said bodies each carrying an optical fibre are connected together the neighbouring end faces of the optical fibres abut or are closely spaced apart.

6. An optical fibre connector comprising at least two separately formed bodies of substantially elongate form each having an axial bore in which an optical fibre can be fitted and means associated with the two bodies or with each pair of adjacent bodies for causing said bodies to move axially with respect to one another, at least the end portion of the bore of one of said bodies being of substantially circular cross-section and having an internal diameter that increases smoothly towards the end of the body to form a socket, at least an end portion of the other of said bodies being of substantially circular cross-section and having an external diameter that decreases smoothly towards the extreme end of the body to form a plug of a configuration that is substantially complementary to the configuration of the socket of the first body, and the arrangement being such that as said bodies are caused to move axially towards one another to connect the bodies together an optical fibre ccarried by one of said bodies is constrained to lie in substantially axial alignment with and to enter the bore of the other of said bodies and that when said bodies each carrying an optical fibre are connected together the neighbouring end faces of the optical fibres abut or are closely spaced apart.

7. An optical fibre connector as claimed in claim 6, wherein the rate of increase in the internal diameter of the socket per unit length increases in a direction towards the extreme end of the body to form a socket of substantially flared form and wherein the plug is of a substantially conical form.

8. An optical fibre connector as claimed in claim 6, wherein the optical fibre carried by the plug protrudes a predetermined distance beyond the extreme end of the plug and, when the body incorporating the socket also carries an optical fibre, the end of this optical fibre is spaced a similar distance from the point in the bore of the body where the diameter of the bore starts to increase, said distances being such that when said bodies are connected together with the plug and socket fully inter-engaged and with parts of the bodies abutting, the end faces of said optical fibres abut or are closely spaced apart.

9. An optical fibre connector as claimed in claim 5, wherein the means associated with said bodies for connecting them together is of a form that will cause said bodies to move axially with respect to one another without effecting relative rotational movement between said bodies.

10. An optical fibre connector as claimed in claim 9, wherein said connecting means comprises a sleeve that surrounds, and is freely rotatably mounted on, one of said bodies and is in screwthreaded engagement with the other of said bodies.

11. An optical fibre connector as claimed in claim 1, wherein the means associated with said bodies for connecting them together comprises a sleeve that surrounds, and is freely rotatably mounted on, one of said bodies and makes a bayonet-type connection with the other of said bodies.

12. An optical fibre connector as claimed in claim 1, wherein at least one of said bodies is mounted in a casing and, where the optical fibre carried by a body is the connecting tail of an optical device, the casing of the body houses the device.

13. An optical fibre connector as claimed in claim 1, in which the optical fibre in at least one of said bodies is of composite form and has a core of transparent liquid, wherein sealing material is provided between the inter-engaging faces of said bodies.

14. An optical fibre connector as claimed in claim 1, wherein one body of the connector has each of its ends shaped for connection to an end of another body.

15. An optical fibre connector as claimed in claim 1, in which an optical fibre is carried by each of said bodies, wherein the optical fibres have diameters such that the diameter of one is greater than that of the other.

16. An optical fibre connector as claimed in claim 1, in which a composite optical fibre comprising a core and a cladding is carried by each of said bodies, wherein the cores of the composite optical fibres have diameters such that the diameter of one is greater than that of the other.

* * * * *